United States Patent
Lim et al.

(10) Patent No.: US 9,582,148 B2
(45) Date of Patent: Feb. 28, 2017

(54) COMPUTING SYSTEM WITH PRESENTATION MECHANISM AND METHOD OF OPERATION THEREOF

(71) Applicant: 4SeTV, Inc., Sunnyvale, CA (US)

(72) Inventors: Hyung Lim, Sunnyvale, CA (US); Samuel Yu, Burlingame, CA (US)

(73) Assignee: 4SeTV, Inc., Santa Clara, CA (US)

(*) Notice: Subject to any disclaimer, the term of this patent is extended or adjusted under 35 U.S.C. 154(b) by 269 days.

(21) Appl. No.: 14/267,709

(22) Filed: May 1, 2014

(65) Prior Publication Data
US 2015/0317041 A1 Nov. 5, 2015

(51) Int. Cl.
*G06F 3/0482* (2013.01)
*G06F 3/0484* (2013.01)
*H04L 29/06* (2006.01)
*H04N 21/84* (2011.01)
*H04N 21/431* (2011.01)
*H04N 21/454* (2011.01)

(52) U.S. Cl.
CPC ........ *G06F 3/0482* (2013.01); *G06F 3/04842* (2013.01); *H04L 65/60* (2013.01); *H04N 21/4312* (2013.01); *H04N 21/454* (2013.01); *H04N 21/84* (2013.01)

(58) Field of Classification Search
CPC .... G06F 15/173; G06F 3/0482; G06F 3/0484; G06F 3/04842
USPC ........................................................ 715/716
See application file for complete search history.

(56) References Cited

U.S. PATENT DOCUMENTS

| | | | |
|---|---|---|---|
| 2012/0233646 A1 | 9/2012 | Coniglio et al. | |
| 2014/0040445 A1* | 2/2014 | Beckert | H04L 67/2823 709/223 |
| 2014/0053191 A1* | 2/2014 | Selim | H04N 5/44 725/37 |

* cited by examiner

Primary Examiner — Andrea Leggett
(74) Attorney, Agent, or Firm — IP Investment Law Group

(57) ABSTRACT

A method of operation of a computing system includes: receiving a content program including a free program, a subscriber based program, or a combination thereof; determining a populating location based on the content program with a control unit for presenting the content program on a plurality of an interface subsection of a device; and updating the populating location based on a content status for changing from one instance of the interface subsection to another instance of the interface subsection to present the content program.

20 Claims, 6 Drawing Sheets

COMPUTING SYSTEM WITH PRESENTATION MECHANISM AND METHOD OF OPERATION THEREOF

TECHNICAL FIELD

An embodiment of the present invention relates generally to a computing system, and more particularly to a system for presentation mechanism.

BACKGROUND ART

Modern portable client and industrial electronics, especially client devices such as cellular phones, portable digital assistants, and combination devices are providing increasing levels of functionality to support modem life including location-based information services. Research and development in the existing technologies can take a myriad of different directions.

As users become more empowered with the growth of devices, new and old paradigms begin to take advantage of this new device space. There are many technological solutions to take advantage of this new device capability to communicate with other devices. One existing approach is to use device movement to provide access through a mobile device, such as a cell phone, smart phone, or a personal digital assistant.

Access services allow users to create, transfer, store, and/or control information in order for users to create, transfer, store, and control in the "real world." One such use of personalized content services is to efficiently transfer or guide users to the desired product or service.

Thus, a need still remains for a computing system with presentation mechanism for aiding the access of devices. In view of the ever-increasing commercial competitive pressures, along with growing client expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a computing system including: receiving a content program including a free program, a subscriber based program, or a combination thereof; determining a populating location based on the content program with a control unit for presenting the content program on a plurality of an interface subsection of a device; and updating the populating location based on a content status for changing from one instance of the interface subsection to another instance of the interface subsection to present the content program.

The present invention provides a computing system, including: a control unit for: receiving a content program including a free program, a subscriber based program, or a combination thereof, determining a populating location based on the content program for presenting the content program on a plurality of an interface subsection, updating the populating location based on a content status for changing from one instance of the interface subsection to another instance of the interface subsection to present the content program, and a communication unit, coupled to the control unit, for communicating the content program for presenting on a device.

The present invention provides a computing system having a non-transitory computer readable medium including instructions for execution, the instructions comprising: receiving a content program including a free program, a subscriber based program, or a combination thereof; determining a populating location based on the content program for presenting the content program on a plurality of an interface subsection of a device; and updating the populating location based on a content status for changing from one instance of the interface subsection to another instance of the interface subsection to present the content program.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
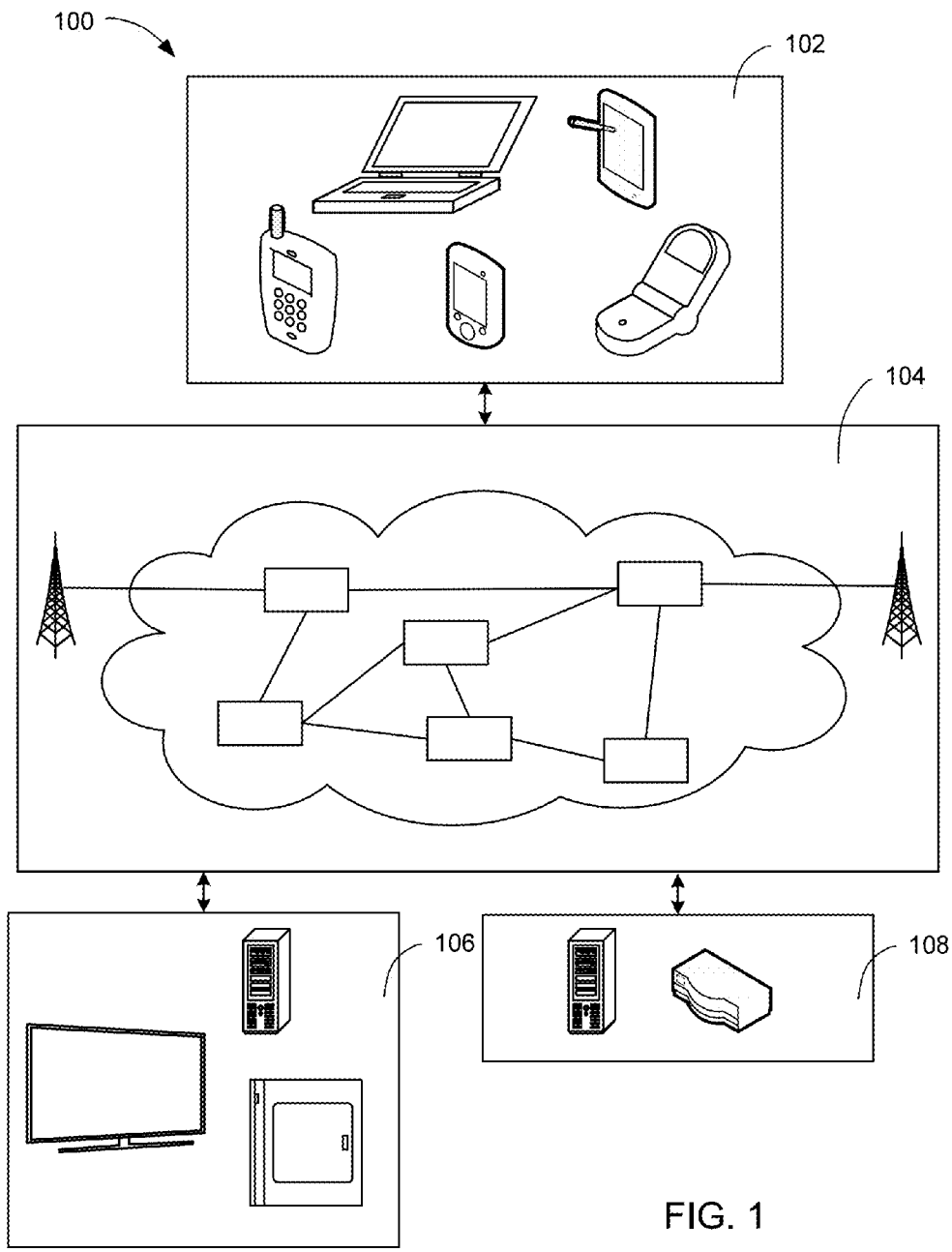
FIG. 1 is a computing system with presentation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with presentation mechanism in an embodiment of the present invention. The computing system 100 includes a first device 102, such as a client or a server, connected to a second device 106, such as a client or server. The first device 102 can communicate with the second device 106 with a communication path 104, such as a wireless or wired network. The computing system 100 can also include a third device 108 connected to the first device 102, the second device 106, or a combination thereof with the communication path 104. The third device 108 can be a client or server.

For example, the first device 102 or the third device 108 can be of any of a variety of devices, such as a cellular phone, personal digital assistant, wearable digital device, tablet, notebook computer, television (TV), router, automotive telematic communication system, or other multi-functional mobile communication or entertainment device. The first device 102 or the third device 108 can be a standalone device, or can be incorporated with a vehicle, for example a car, truck, bus, aircraft, boat/vessel, or train. The first device 102 or the third device 108 can couple to the communication path 104 to communicate with the second device 106.

For illustrative purposes, the computing system 100 is described with the first device 102 as a mobile device, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, set-top box, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102 or the third device 108. The second device 106 can also be a client type device as described for the first device 102 or the third device 108.

In another example, the first device 102, the second device 106, or the third device 108 can be a particularized machine, such as a mainframe, a server, a cluster server, a rack mounted server, or a blade server, or as more specific examples, an IBM System z10™ Business Class mainframe or a HP ProLiant ML™ server. Yet another example, the first device 102, the second device 106, or the third device 108 can be a particularized machine, such as a portable computing device, a thin client, a notebook, a netbook, a smartphone, a personal digital assistant, a tablet, or a cellular phone, and as specific examples, an Apple iPad™, Android™ tablet, or Windows™ platform tablet.

For illustrative purposes, the computing system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the computing system 100 is shown with the second device 106 and the first device 102 or the third device 108 as end points of the communication path 104, although it is understood that the computing system 100 can have a different partition between the first device 102, the second device 106, the third device 108, and the communication path 104. For example, the first device 102, the second device 106, the third device 108 or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
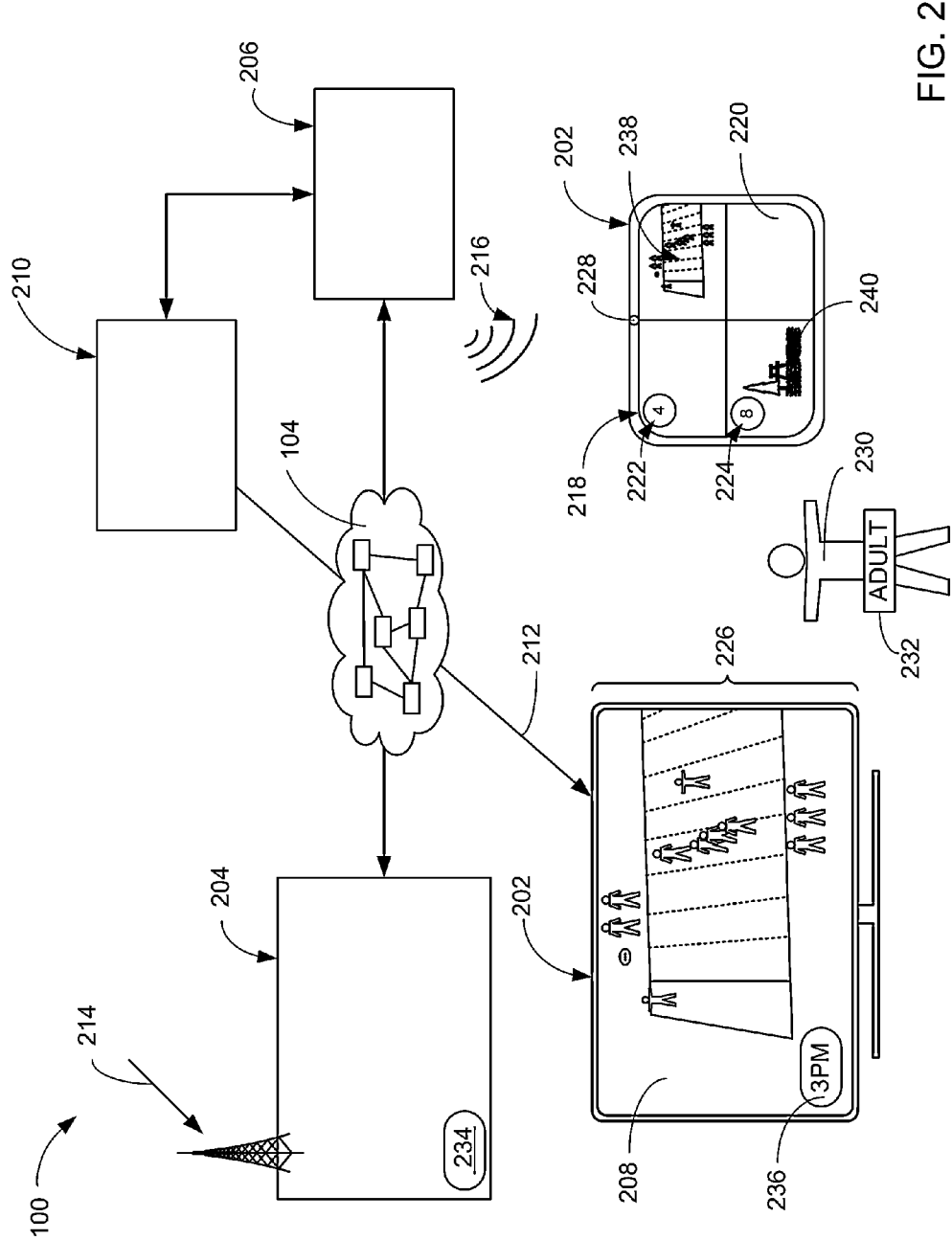
FIG. 2 is an example of an architectural diagram of the computing system including a client device, an electronic device, a communication device, or a combination thereof.

Referring now to FIG. 2, therein is shown an example of an architectural diagram of the computing system 100 including a client device 202, an electronic device 204, a communication device 206, or a combination thereof. The client device 202 is defined as a device presenting a content program 208. For example, the client device 202 can represent the first device 102 of FIG. 1 representing a TV. For another example, the client device 202 can represent the first device 102 representing a tablet.

The electronic device 204 is defined as a device controlling the display of the content program 208. For example, the electronic device 204 can provide the content program 208 to be displayed on the client device 202. The electronic device 204 can receive the content program 208 from a provider type 210 including over the air (OTA), a subscriber based provider, or a combination thereof. The electronic device 204 can represent the second device 106 of FIG. 1.

The communication device 206 is defined as a device routing the content program 208. For example, the communication device 206 can represent the third device 108 of FIG. 1 representing a cable modem, a digital subscriber line (DSL) modem, a satellite receiver, a router, or a combination thereof. The communication device 206 can receive the content program 208 from the subscriber based provider.

The electronic device 204 can receive the content program 208 from the communication device 206 to control the content program 208 to be displayed on the client device 202. Once the electronic device 204 determines how the content program 208 should be displayed on the client device 202, the electronic device 204 can communicate the content program 208 to the communication device 206 to be communicated to the client device 202 via the communication path 104.

For a different embodiment, the electronic device 204 can include the functionalities of a cable modem, a DSL modem, a satellite receiver, a router, or a combination thereof. As a result, the client device 202 and the electronic device 204 can interact via the communication path 104 without the communication device 206. More specifically, the electronic device 204 can directly provide the content program 208 to the client device 202.

The content program 208 is defined as a broadcasted content. For example, the content program 208 can include a program type 212 including a free program 214, a subscriber based program 216, or a combination thereof. The program type 212 is defined as a category of the content program 208 according to a cost for viewing the content program 208. The free program 214 is defined as the broadcasted program received via OTA. The subscriber based program 216 is defined as the broadcasted program received from a subscriber based provider, such as a cable company.

The provider type 210 is a category of a content provider, such as the OTA or the subscriber based provider. The electronic device 204 can receive the free program 214 from the OTA. The communication device 206, the electronic device 204, or a combination thereof can receive the subscriber based program 216 from the subscriber based provider.

The client device 202 can display the content program 208 on a display interface 218, an interface subsection 220, or a combination thereof. The display interface 218 is defined as a surface area of the client device 202 where the content program 208 can be displayed. The interface subsection 220 is defined as a segmented surface area of the display interface 218.

For example, the computing system 100 can provide the display interface 218 to be segmented into rows and columns to provide the interface subsection 220. More specifically, if the display interface 218 is segmented into 3 rows and 3 columns, the client device 202 can have an interface count 222 of 9 for the interface subsection 220.

For further example, the computing system 100 can determine a populating location 238 for presenting the content program 208. The populating location 238 is defined as a location on the display interface 218 to display the content program 208. Continuing with the previous example, if the display interface 218 is divided into two rows and two columns to have a plurality of the interface subsection 220, each instances of the interface subsection 220 can represent the populating location 238 for displaying the content program 208 on the display interface 218.

The interface count 222 is defined as a number of the interface subsection 220 provided on the client device 202. A count threshold 224 is defined as a maximum number of the interface subsection 220 provided on the client device 202. A display size 226 is defined as a spatial proportion of the display interface 218, the interface subsection 220, or a combination thereof. A detecting sensor 228 can represent accelerometer, magnetometer, gyroscope, microphone, camera, video recorder, or the combination thereof.

A current location 230 is defined as the physical location of the client device 202. For example, the current location 230 can represent the physical location of the user of the client device 202. An audience type 232 can represent a type of user viewing the content program 208 presented on the client device 202. For example, the audience type 232 can include an adult, a child, or a combination thereof.

A user profile 234 is defined as user's personal information. For example, the user profile 234 can include the age, gender, profession, or a combination thereof. A timeframe 236 can represent a period of time. For example, the timeframe 236 can include a time of day, week, year, season, or a combination thereof. An activity history 240 is defined as a log of a pattern of presentation of the content program 208. For example, the activity history 240 can indicate that the user displays the content program 208 representing an American football game on the top right instance of the interface subsection 220.

Figure 3:
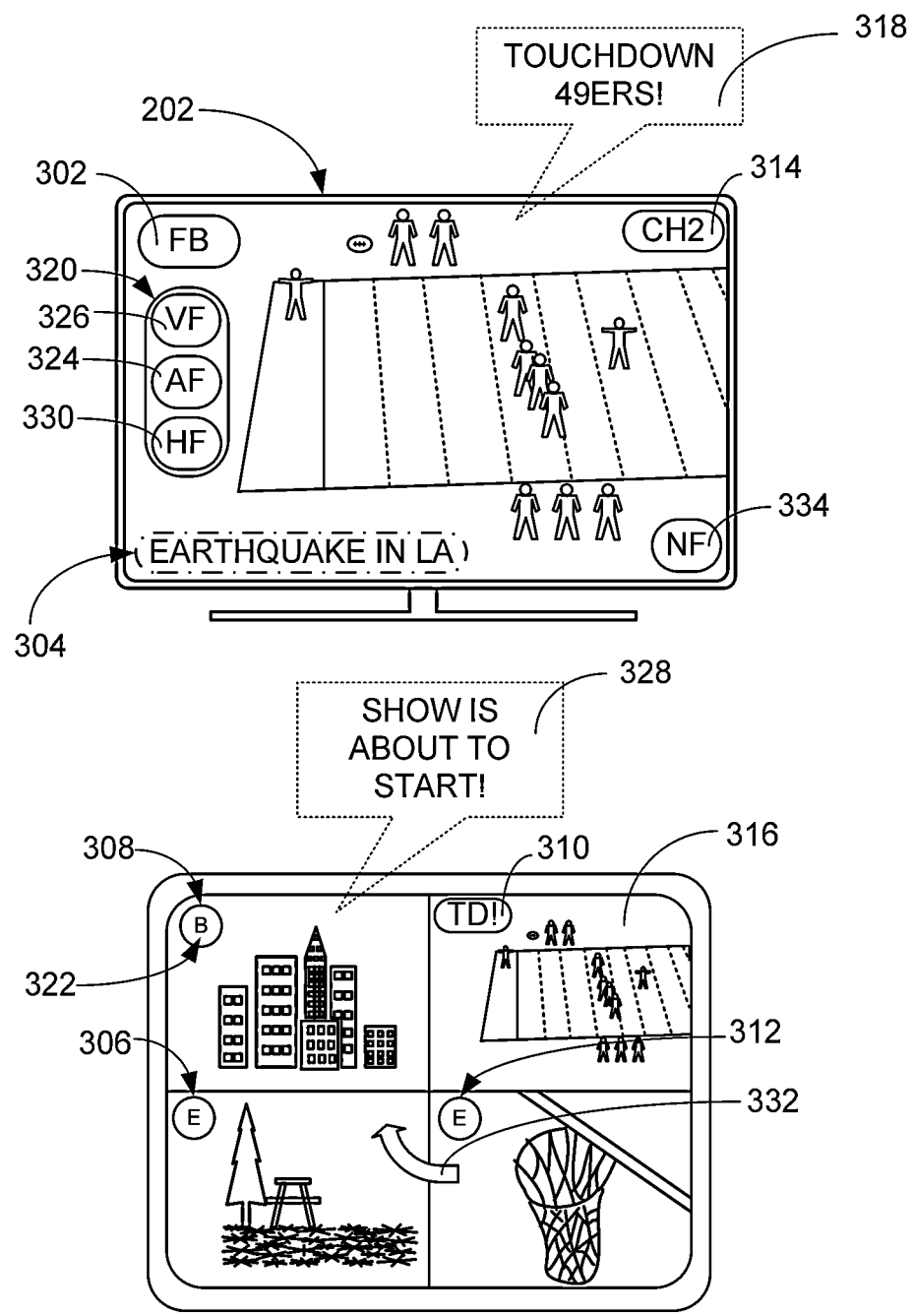
FIG. 3 is an example of the content program of FIG. 2 presented on the client device.

Referring now to FIG. 3, therein is shown an example of the content program 208 of FIG. 2 presented on the client device 202. The content program 208 can include a content type 302, which is defined as a genre of the content program 208. For example, the content type 302 can include TV drama, sports, cartoon, cinema, a notification 304, or a combination thereof. The notification 304 can include a commercial advertisement, breaking news, amber alert, or a combination thereof.

The content program 208 can include a content status 306, which is defined as a progression state of the content program 208. For example, the content status 306 can include a content beginning 308, a content event 310, a content end 312, or a combination thereof. The content event 310 is defined as a situation presented in the content program 208. For example, the content program 208 can represent a broadcasted baseball game. The content event 310 can represent a batter hitting a homerun in the baseball game.

A program channel 314 is defined as a range of frequencies assigned by the government for the operation of a content provider. For example, the program channel 314 can include a radio station channel, television channel, or a combination thereof. A program coverage 316 is a reporting of an event. For example, the content program 208 representing a baseball game can provide the program coverage 316 when the content event 310 of a batter hitting the homerun in the 7th inning. A content audio 318 is defined as sound presented along with the content program 208.

The client device 202 can provide a feedback 320, which is defined as an alert triggered based on a trigger point 322. For example, the feedback 320 can include a feedback type 324, which is defined as a category of the feedback 320. The feedback type 324 can include a visual feedback 326, an audio feedback 328, a haptic feedback 330, or a combination thereof. The trigger point 322 is defined as a particular instance of the content status 306 that invokes an action by the computing system 100. For example, the trigger point 322 can be set at the content beginning 308, the content end 312, a particular instance of the content event 310, or a combination thereof.

A channel rotation 332 is defined as a direction of the program channel 314 being rotated from one instance of the interface subsection 220 of FIG. 2 to another instance of the interface subsection 220. For example, the channel rotation 332 can include rotating the program channel 314 in the direction of clockwise, counterclockwise, up, down, diagonal, or a combination thereof.

A presentation filter 334 is defined as a command to remove a particular instance of the content program 208 from being presented. For example, the presentation filter 334 can represent a command to "filter" or "no filter." For further example, the presentation filter 334 can be granular for different level of filtration. As an example, the presentation filter 334 can include "low filter," "medium filter," "high filter," or a combination thereof. The presentation filter 334 can also include a range of filtration based on a numeric value between 0 and 10 where 10 representing complete filter and 0 representing no filter.

Figure 4:
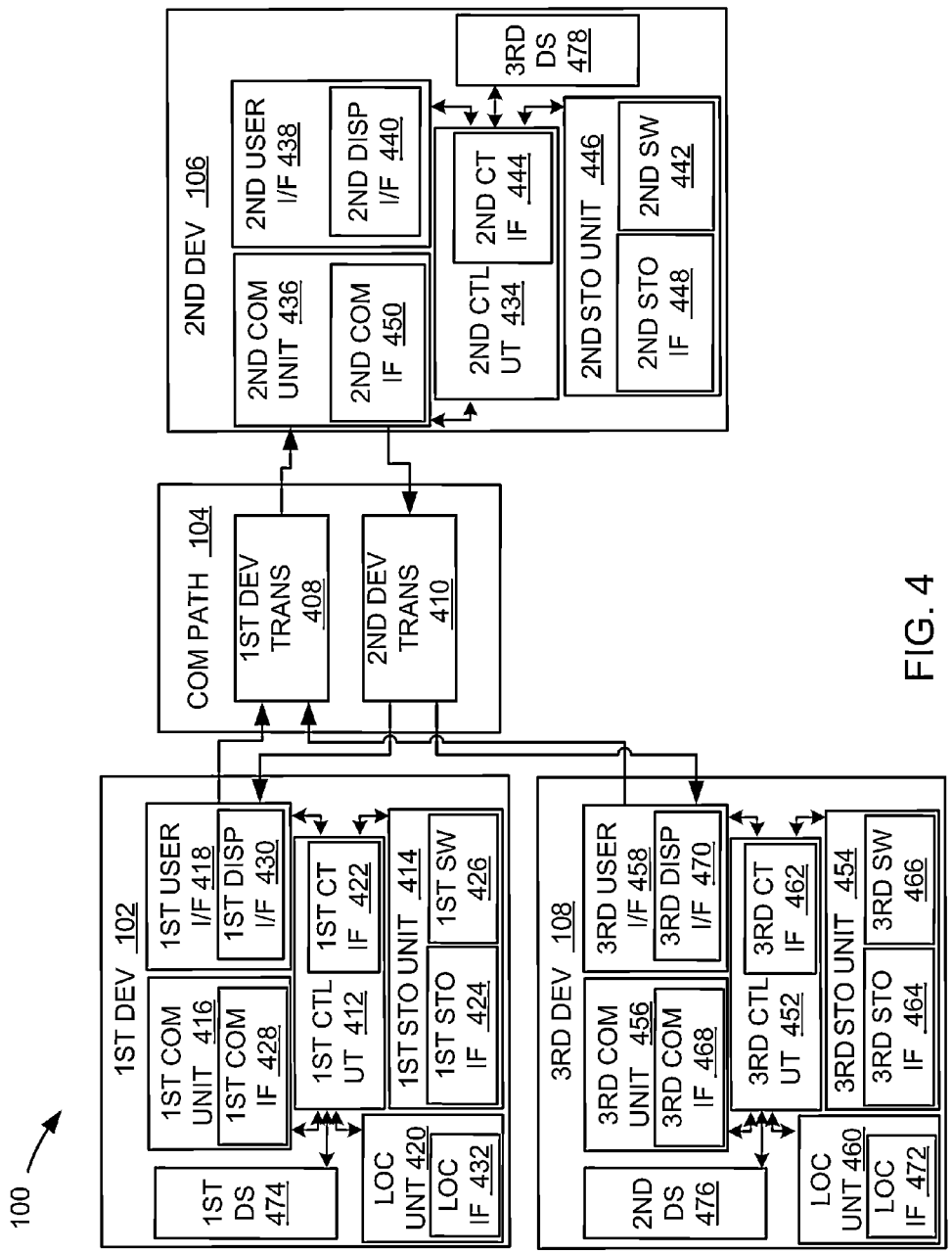
FIG. 4 is an exemplary block diagram of the computing system.

Referring now to FIG. 4, therein is shown an exemplary block diagram of the computing system 100. The computing system 100 can include the first device 102, the third device 108, the communication path 104, and the second device 106. The first device 102 or the third device 108 can send information in a first device transmission 408 over the communication path 104 to the second device 106. The second device 106 can send information in a second device transmission 410 over the communication path 104 to the first device 102 or the third device 108.

For illustrative purposes, the computing system 100 is shown with the first device 102 or the third device 108 as a client device, although it is understood that the computing system 100 can have the first device 102 or the third device 108 as a different type of device. For example, the first device 102 or the third device 108 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 or the third device 108 will be described as a client device and the second device 106 will be described as an electronic device. The embodiment of the present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the computing system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof. The relevant information can also include news, media, events, or a combination thereof from the third party content provider.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the first device 102 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the computing system 100. The first control unit 412 can also execute the first software 426 for the other functions of the computing system 100, including receiving location information from the location unit 420. The first control unit 412 can further execute the first software 426 for interaction with the communication path 104 via the first communication unit 416.

The second device 106 can be optimized for implementing the embodiment of the present invention in a multiple device embodiment with the second device 106. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the computing system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the computing system 100, including operating the second communication unit 436 to communicate with the second device 106 over the communication path 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the computing system 100 is shown with the second storage unit 446 as a single hierarchy storage system, although it is understood that the computing system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The computing system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The third device 108 can include a third control unit 452, a third storage unit 454, a third communication unit 456, a third user interface 458, and a location unit 460. The third control unit 452 can include a third control interface 462. The third control unit 452 can execute a third software 466 to provide the intelligence of the computing system 100. The third control unit 452 can be implemented in a number of different manners. For example, the third control unit 452 can be a processor, an embedded processor, a microprocessor, a hardware control logic, a hardware finite state machine (FSM), a digital signal processor (DSP), or a combination thereof. The third control interface 462 can be used for communication between the third control unit 452 and other functional units in the third device 108. The third control interface 462 can also be used for communication that is external to the third device 108.

The third control interface 462 can receive information from the other functional units or from external sources, or can transmit information to the other functional units or to external destinations. The external sources and the external destinations refer to sources and destinations physically separate to the third device 108.

The third control interface 462 can be implemented in different ways and can include different implementations depending on which functional units or external units are being interfaced with the third control interface 462. For example, the third control interface 462 can be implemented with a pressure sensor, an inertial sensor, a microelectromechanical system (MEMS), optical circuitry, waveguides, wireless circuitry, wireline circuitry, or a combination thereof.

The location unit 460 can generate location information, current heading, and current speed of the third device 108, as examples. The location unit 460 can be implemented in many ways. For example, the location unit 460 can function as at least a part of a global positioning system (GPS), an inertial navigation system, a cellular-tower location system, a pressure location system, or any combination thereof.

The location unit 460 can include a location interface 472. The location interface 472 can be used for communication between the location unit 460 and other functional units in the third device 108. The location interface 472 can also be used for communication that is external to the third device 108.

The location interface 472 can receive information from the other functional units or from external sources, or can transmit information to the other functional units or to external destinations. The external sources and the external destinations refer to sources and destinations physically separate to the third device 108.

The location interface 472 can include different implementations depending on which functional units or external units are being interfaced with the location unit 460. The location interface 472 can be implemented with technologies and techniques similar to the implementation of the third control interface 462.

The third storage unit 454 can store the third software 466. The third storage unit 454 can also store the relevant information, such as advertisements, points of interest (POI), navigation routing entries, or any combination thereof.

The third storage unit 454 can be a volatile memory, a nonvolatile memory, an internal memory, an external memory, or a combination thereof. For example, the third storage unit 454 can be a nonvolatile storage such as non-volatile random access memory (NVRAM), Flash memory, disk storage, or a volatile storage such as static random access memory (SRAM).

The third storage unit 454 can include a third storage interface 464. The third storage interface 464 can be used for communication between the location unit 460 and other functional units in the third device 108. The third storage interface 464 can also be used for communication that is external to the third device 108.

The third storage interface 464 can receive information from the other functional units or from external sources, or can transmit information to the other functional units or to external destinations. The external sources and the external destinations refer to sources and destinations physically separate to the third device 108.

The third storage interface 464 can include different implementations depending on which functional units or external units are being interfaced with the third storage unit 454. The third storage interface 464 can be implemented with technologies and techniques similar to the implementation of the third control interface 462.

The third communication unit 456 can enable external communication to and from the third device 108. For example, the third communication unit 456 can permit the third device 108 to communicate with the second device 106 of FIG. 1, an attachment, such as a peripheral device or a computer desktop, and the communication path 104.

The third communication unit 456 can also function as a communication hub allowing the third device 108 to function as part of the communication path 104 and not limited to be an end point or terminal unit to the communication path 104. The third communication unit 456 can include active and passive components, such as microelectronics or an antenna, for interaction with the communication path 104.

The third communication unit 456 can include a third communication interface 468. The third communication interface 468 can be used for communication between the third communication unit 456 and other functional units in the third device 108. The third communication interface 468 can receive information from the other functional units or can transmit information to the other functional units.

The third communication interface 468 can include different implementations depending on which functional units are being interfaced with the third communication unit 456. The third communication interface 468 can be implemented with technologies and techniques similar to the implementation of the third control interface 462.

The third user interface 458 allows a user (not shown) to interface and interact with the third device 108. The third user interface 458 can include an input device and an output device. Examples of the input device of the third user interface 458 can include a keypad, a touchpad, soft-keys, a keyboard, a microphone, or any combination thereof to provide data and communication inputs.

The third user interface 458 can include a third display interface 470. The third display interface 470 can include a display, a projector, a video screen, a speaker, or any combination thereof.

The third control unit 452 can operate the third user interface 458 to display information generated by the computing system 100. The third control unit 452 can also execute the third software 466 for the other functions of the computing system 100, including receiving location information from the location unit 460. The third control unit 452 can further execute the third software 466 for interaction with the communication path 104 via the third communication unit 456.

The functional units in the first device 102 can work individually and independently of the other functional units. The first device 102 can work individually and independently from the second device 106, the third device 108, and the communication path 104.

The functional units in the second device 106 can work individually and independently of the other functional units. The second device 106 can work individually and independently from the first device 102, the third device 108, and the communication path 104.

The functional units in the third device 108 can work individually and independently of the other functional units. The third device 108 can work individually and independently from the first device 102, the second device 106, and the communication path 104.

For illustrative purposes, the computing system 100 is described by operation of the first device 102, the second device 106, and the third device 108. It is understood that the first device 102, the second device 106, the third device 108 can operate any of the modules and functions of the computing system 100. For example, the first device 102 is described to operate the location unit 420, although it is understood that the second device 106 or the third device 108 can also operate the location unit 420.

A first detecting sensor 474 can represent the detecting sensor 228 of FIG. 2. Examples of the first detecting sensor 474 can include accelerometer, magnetometer, gyroscope, microphone, camera, video recorder, or the combination thereof.

A second detecting sensor 476 can represent the detecting sensor 228. Examples of the second detecting sensor 476 can include accelerometer, magnetometer, gyroscope, microphone, camera, video recorder, or the combination thereof.

A third detecting sensor 478 can represent the detecting sensor 228. Examples of the third detecting sensor 478 can include accelerometer, magnetometer, gyroscope, microphone, camera, video recorder, or the combination thereof.

Figure 5:
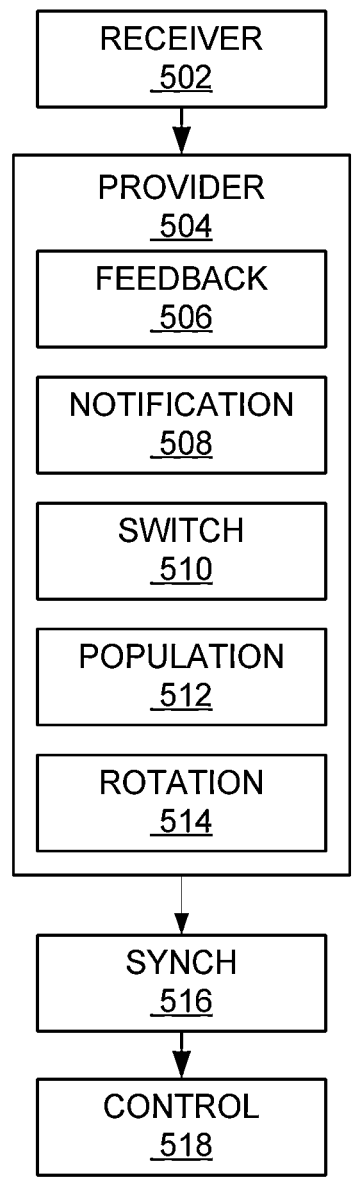
FIG. 5 is a control flow of the computing system.

Referring now to FIG. 5, therein is shown a control flow of the computing system 100 of FIG. 1. For clarity and brevity, the discussion of the control flow will focus on the first device 102 of FIG. 1 or the third device 108 of FIG. 1 communicating with the second device 106 of FIG. 1. However, the first device 102, the second device 106, the third device 108, or a combination thereof can be discussed interchangeably. The discussion of the specificity of the modules pertaining to the first device 102, the second device 106, the third device 108, or a combination thereof will be discussed when appropriate.

For further example, the first device 102 can represent the device used by the user represented as the client device 202 of FIG. 2. The third device 108 can represent the communication device 206 of FIG. 2. The second device 106 can represent the electronic device 204 of FIG. 2 communicated by the first device 102, the third device 108, or a combination thereof.

The computing system 100 can include a receiver module 502. The receiver module 502 receives the content program 208 of FIG. 2. For example, the receiver module 502 can receive the content program 208 based on the provider type 210 of FIG. 2, the program type 212 of FIG. 2, or a combination thereof.

The receiver module 502 can receive the content program 208 in a number of ways. For example, the receiver module 502 can receive the content program 208 based on the provider type 210 including an OTA, a subscriber based provider, or a combination thereof. The receiver module 502 can receive the content program 208 based on the program type 212 including the free program 214 of FIG. 2, the subscriber based program 216 of FIG. 2, or a combination thereof.

The receiver module 502 can receive the free program 214 via the first communication unit 416 of FIG. 4 representing the OTA antenna. For a different example, the receiver module 502 can receive the subscriber based program 216 from the subscriber based provider via the communication device 206, directly from the subscriber based provider, or a combination thereof. The receiver module 502 can communicate the content program 208 to a provider module 504.

The computing system 100 can include the provider module 504, which can couple to the receiver module 502. The provider module 504 provides the content program 208. For example, the provider module 504 can provide the content program 208 based on the program type 212 for presenting on the client device 202. For another example, the provider module 504 can provide a plurality of the content program 208 based on aggregating the free program 214, the subscriber based program 216, or a combination thereof received from a plurality of the provider type 210 for displaying on the client device 208.

The provider module 504 can provide the content program 208 in a number of ways. As discussed above, the provider module 504 can provide the content program 208 based on the program type 212 including the free program 214, the subscriber based program 216, or a combination thereof. More specifically, the provider module 504 can provide the free program 214, the subscriber based program 216, or a combination thereof for displaying on the display interface 218 of FIG. 2 of the client device 202.

The provider module 504 can include a feedback module 506. The feedback module 506 provides the feedback 320 of FIG. 3. For example, the provider module 504 can provide the feedback 320 based on the feedback type 324 of FIG. 3.

The feedback module 506 can provide the feedback 320 in a number of ways. For example, the feedback type 324 can include the visual feedback 326 of FIG. 3, the audio feedback 328 of FIG. 3, the haptic feedback 330 of FIG. 3. The feedback module 506 can provide each instances of the feedback type 324 based on the trigger point 322 of FIG. 3 of the content program 208.

For a specific example, the trigger point 322 can base on the content type 302 of FIG. 3 of the content program 208. More specifically, the content type 302 can include a commercial advertisement, a scheduled program, or a combination thereof. Furthermore, the feedback module 506 can set the trigger point 322 at the content status 306 of FIG. 3 including the content beginning 308 of FIG. 3, the content end 312 of FIG. 3, the content event 310 of FIG. 3, or a combination thereof.

As an example, the feedback module 506 can set various instances of the trigger point 322 with a various instance of the feedback type 324. For example, the feedback module 506 can set the audio feedback 328 at the content beginning 308 for the content type 302 of a scheduled show to notify user of the computing system 100 that the show is starting. For another example, the feedback module 506 can set the haptic feedback 330 during the content event 310 of when a goal is scored in a soccer game. For further example, the feedback module 506 can set the visual feedback 326 at the content end 312 of the content type 302 representing a commercial advertisement to notify that the scheduled program is about to start.

For further example, the feedback module 506 can provide the feedback 320 to a plurality of the client device 202. More specifically, one instance of the client device 202 can represent a tablet. Another instance of the client device 202 can represent a TV. The feedback module 506 can provide same instances of the feedback type 324 or different instances of the feedback type 324 for a plurality of the client device 202.

For example, the feedback module 506 can provide the visual feedback 326, the audio feedback 328, or a combination thereof based on the client device 202 representing TV. The feedback module 506 can provide the haptic feedback 330 to the client device 202 representing the tablet.

For further example, the feedback module 506 can provide the feedback 320 to one instance of the client device 202 based on the content program 208 displayed on another instance of the client device 202. More specifically, the display interface 218 of the client device 202 representing a TV can display the content type 302 of a scheduled program representing a TV drama series. The display interface 218 of the client device 202 representing a tablet can display the content type 302 of a basketball game.

The trigger point 322 for the TV drama series can be set at the content end 312 of a commercial advertisement. When the commercial advertisement ends, the feedback module 506 can provide the haptic feedback 330 to the client device 202 representing a tablet to notify the user of the computing system 100 that the TV drama series is about to begin. The feedback module 506 can communicate the feedback 320 to the client device 202.

The provider module 504 can include a notification module 508. The notification module 508 provides the notification 304 of FIG. 3. For example, the notification module 508 can provide the notification 304 based on aggregating a plurality of the content program 208.

The notification module 508 can provide the notification 304 in a number of ways. For example, the notification module 508 can provide the notification 304 based on a plurality of the content program 208 displayed on a plurality of the interface subsection 220 of FIG. 2 of the display interface 218. As an example, the display interface 218 can include 4 instances of the interface subsection 220. Each instance of the interface subsection 220 can display the content type 302 representing an American Football game. Based on the content type 302, the notification module 508 can provide the notification 304 representing an advertisement for an alcohol commercial.

Continuing with the example, the notification module 508 can provide the notification 304 based on the content status 206 of the content program 208 displayed on the interface subsection 220. As discussed above, each instances of the interface subsection 220 can display a different game of American Football from one another. One instance of the interface subsection 220 can display the content event 310 representing a touchdown. Another instance of the interface subsection 220 can display the content event 310 representing an injury timeout. Based on the content event 310, the notification module 508 can provide a plurality of the notification 304 for each instance of the content event 310 displayed on each instance of the interface subsection 220.

For further example, the notification module 508 can provide the notification 304 based on prioritizing the content event 310 displayed on one instance of the interface subsection 220 over the content event 310 displayed on another instance of the interface subsection 220. As discussed above, one instance of the content event 310 can represent an injury timeout. Even though another instance of the content event 310 represents a touchdown, the content event 310 having the content type 302 related to breaking news, physical harm, or a combination thereof can have a higher priority than the content type 302 representing entertainment. More specifically, because the content event 310 represented an injury timeout, the notification module 508 can provide the notification 304 representing injury status and not provide the commercial advertisement for alcohol related products. The notification module 508 can provide the notification 304 based on prioritizing one instance of the content type 302 over another instance of the content type 302.

It has been discovered that the computing system 100 providing the notification 304 based on prioritizing the content type 302, the content event 310, or a combination thereof improves the efficiency of presenting the content program 208. By prioritizing the content type 302, the computing system 100 can select the notification 304 relevant to the user. As a result, the computing system 100 can improve the user experience of operating the client device 202, the computing system 100, or a combination thereof.

For a different example, the notification module 508 can provide the notification 304 to one instance of the client device 202 based on the content program 208 displayed on another instance of the client device 202. As discussed above, the display interface 218 of the client device 202 representing a TV can display the content type 302 of a scheduled program representing a TV drama series. The display interface 218 of the client device 202 representing a tablet can display the content type 302 of a basketball game.

The TV drama included a product placement for an automobile. The notification module 508 can provide the notification 304 representing an advertisement for automobile displayed on the TV drama for displaying on the display interface 218 of the client device 202 representing a tablet. The notification module 508 can communicate the notification 304 to the client device 202 for displaying on the display interface 218.

It has been discovered that the computing system 100 providing the notification 304 based on the content program 208 displayed on one instance of the client device 202 to another instance of the client device 202 improves the efficiency of delivering the notification 304, the content program 208, or a combination thereof. By providing the notification 304 to multiple instances of the client device 202 based on the content program 208 displayed on one instance of the client device 202, the computing system 100 can improve reaching out to the user. As a result, the computing system 100 can improve the monetization of the content program 208, the notification 304, or a combination thereof delivered.

The provider module 504 can include a switch module 510. The switch module 510 switches the content program 208. For example, the switch module 510 can switch the content program 208 based on the content type 302 displayed on the client device 202.

The switch module 510 can switch the content program 208 in a number of ways. For example, the client device 202 can represent a TV. The display interface 218 of the TV can include the plurality of the interface subsection 220. More specifically, the TV can display two instances of the content program 208 on two instances of the interface subsection 220 each.

For example, the switch module 510 can switch the content program 208 based on the content type 302 representing a commercial advertisement. More specifically, the TV can display the content type 302 representing a basketball game on one instance of the interface subsection 220 and content type 302 representing a soccer match on another instance of the interface subsection 220. The switch module 510 can switch the display from a plurality of the interface subsection 220 to a single instance of the display interface 218 in its entirety based on the content type 302. The switch module 510 can switch back from the single instance of the display interface 218 back into a plurality of the interface subsection 220 based on the content type 302.

Continuing with the example, one instance of the interface subsection 220 can display the content type 302 of from a basketball game to a TV commercial. The other instance of the interface subsection 220 can still display the content type 302 of a soccer match. The switch module 510 can switch from displaying a plurality of the content program 208 on instances of the interface subsection 220 to a single instance of the display interface 218 based on the content type 302. More specifically, the switch module 510 can switch to the content program 208 representing the soccer match to be displayed on the display interface 218 and not display the content program 208 representing the TV commercial.

For further example, the switch module 510 can switch the content type 302 to be displayed based on the content beginning 308, the content event 310, the content end 312, the trigger point 322, or a combination thereof. For example, the switch module 510 can switch away from the content type 302 representing a TV commercial based on detecting the content end 312 of a basketball game, detecting the content beginning 308 a TV commercial, or a combination thereof. The switch module 510 can switch back to the content type 302 representing a basketball game based on detecting the content end 312 of the TV commercial, detecting the content beginning 308 of the basketball game, or a combination thereof.

For a different example, the switch module 510 can switch the content program 208 based on the content type 302 displayed on another instance of the client device 202. For example, the content type 302 displayed on the client device 202 representing a TV can represent a TV commercial. The content type 302 displayed on the client device 202 representing a tablet can display a baseball game. The switch module 510 can switch the content program 208 displayed on the TV from a commercial to the content program 208 displayed on the tablet. More specifically, the TV can display the baseball game until the content end 312 of the TV commercial is detected.

For a different example, the switch module 510 can switch the content program 208 based on the program coverage 316 of FIG. 3. For example, the client device 202 representing TV can have two instances of the interface subsection 220 displaying the content program 208 representing a baseball game. More specifically, one instance of the interface subsection 220 can display the baseball game from the program coverage 316 representing a perspective of the pitcher throwing the ball to the catcher. Another instance of the interface subsection 220 can display the baseball game from the program coverage 316 representing a perspective of the outfield.

The content event 310 can represent a batter hitting the pitch. The switch module 510 can switch the content program 208 to display the program coverage 316 that covers the flight of the ball to be displayed on the display interface 218 of the TV in its entirety. More specifically, the switch module 510 can switch away from the interface subsection 220 displaying the pitcher to a single instance of the display interface 218 based on the program coverage 316 of the content program 208. The switch module 510 can communicate the content program 208 being switched to the client device 202.

It has been discovered that the computing system 100 switching the content program 208 based on the trigger point 322 can improve the delivery of the content program 208. By detecting the trigger point 322 for the content program 208, the computing system 100 can switch from the content program 208 irrelevant to the user to the content program 208 relevant to the user. As a result, the computing system 100 can improve the delivery of the content program 208 to enhance the user experience of operating the client device 202, the computing system 100, or a combination thereof.

The provider module 504 can include a population module 512. The population module 512 determines the interface subsection 220 used for displaying the content program 208. For example, the population module 512 can determine the interface count 222 of FIG. 2 of the interface subsection 220.

The population module 512 can determine the interface subsection 220 in a number of ways. For example, the population module 512 can determine the interface count 222 based on the user profile 234 of FIG. 2, the content type 302, or a combination thereof. More specifically, the user profile 234 can indicate the number of the interface subsection 220 to be used to display a plurality of the content program 208 on the display interface 218. The user profile 234 can indicate 4 for the number of interface subsection 220. The population module 512 can determine the interface count 222 of the interface subsection 220 to represent 4.

For another example, the user profile 234 can include the interface count 222 for when a particular instance of the content type 302 is displayed on the client device 202. As an example, the interface count 222 can represent 1 if the content type 302 representing a soccer match for Federation Internationale de Football Association (FIFA) World Cup is displayed on the display interface 218. As a result, the population module 512 can determine that the interface subsection 220 to be used will be the entirety of the display interface 218 when a particular instance of the content type 302 is displayed. In contrast, if the user profile 234 indicates that if the content type 302 is not of a particular instance of the content type 302 with the restriction of the interface count 222 of 1, the population module 512 can determine the interface count 222 to represent greater than 1 but less than the count threshold 224 of FIG. 2.

For a different example, the population module 512 can select the interface subsection 220 to display the content program 208. As an example, the display interface 218 can be divided into 2 rows and 2 columns to provide 4 instances of the interface subsection 220. The population module 512 can determine the instance or instances of the interface subsection 220 out of the 4 instances of the interface subsection 220 for displaying the content program 208.

For a specific example, the population module 512 can select the interface subsection 220 based on the user profile 234, the content type 302, the timeframe 236 of FIG. 2, or a combination thereof. As an example, the user profile 234 can indicate that the content type 302 representing news program can be displayed on the top row. The population module 512 can determine the instance of the interface subsection 220 for displaying the content program 208 to locate at the top row when the content type 302 representing new program is selected by the user.

For another example, the population module 512 can change the populating location 238 of FIG. 2 based on the timeframe 236. More specifically, the population module 512 can determine the populating location 238 for the content type 302 representing a cartoon can represent the interface subsection 220 located on the left column when the timeframe 236 is between 9 am to 11 am. The population module 512 can update the populating location 238 for the cartoon to the interface subsection 220 located on the right column when the timeframe 236 is between 2 pm to 4 pm. The population module 512 can communicate the interface count 222, the populating location 238, or a combination thereof to the client device 202.

For another example, the population module 512 can update the populating location 238 based on the content type 302, the activity history 240 of FIG. 2, or a combination thereof. More specifically, a plurality and a variety of the content program 208 can be displayed on each instances of the interface subsection 220. The display interface 218 can be segmented into 2 rows and 2 columns as discussed above to provide 4 instances on the interface subsection 220.

The activity history 240 can indicate that the client device 202 displayed the content type 302 representing the news on the top left instance of the interface subsection 220. Furthermore, the activity history 240 can indicate that the client device 220 displayed the content type 302 representing cartoon on the bottom right instance of the interface subsection 220. Based on the activity history 240 and the content type 302, the population module 512 can determine the populating location 238 for the content program 208 representing the news to locate on the top left instance of the interface subsection 220 and cartoon to locate on the bottom right instance of the interface subsection 220.

It has been discovered that the computing system 100 updating the populating location 238 of the content program 208 improves the efficiency of the delivery of the content program 208. By changing the populating location 238 based on the user profile 234, the content type 302, the timeframe 236, or a combination thereof, the user can view the content program 208 on the interface subsection 220 most optimal to the user. As a result, the computing system 100 can improve the user experience operating the client device 202, the computing system 100, or a combination thereof.

The provider module 504 can provide a rotation module 514. The rotation module 514 rotates the program channel 314 of FIG. 3. For example, the rotation module 514 can rotate the program channel 314 for the content program 208 from one instance of the interface subsection 220 to another instance of the interface subsection 220.

The rotation module 514 can rotate the program channel 314 in a number of ways. For example, the rotation module 514 can rotate the program channel 314 based on the content status 306 including the content beginning 308, the content event 310, the content end 312, or a combination thereof. As discussed above, the display interface 218 can be segmented into 2 rows and 2 columns to include 4 instances of the interface subsection 220.

For a specific example, the content program 208 for one instance of program channel 314 displayed on the top left corner instance of interface subsection 220 ended based on the content end 312. The rotation module 514 can rotate the program channel 314 with the content program 208 indicating the content end 312 to the top right corner instance of the interface subsection 220. Furthermore, the rotation module 514 can rotate another instance of the program channel 314 with the content program 208 indicating the content beginning 308 from the bottom right corner instance of the interface subsection 220 to the top right corner instance of the interface subsection 220.

Continuing with the example, the rotation module 514 can rotate the program channel 314 based on the channel rotation 332 of FIG. 3. The channel rotation 332 can include clockwise, counterclockwise, up, down, diagonal, or a combination thereof. More specifically, the rotation module 514 can rotate the program channel 314 according to the channel rotation 332 based on the content status 306.

For example, if the content status 306 indicates the content beginning 308, the rotation module 514 can rotate the program channel 314 in the channel rotation 332 representing from bottom row instance of the interface subsection 220 to top row instance of the interface subsection 220. Moreover, if the content status 306 indicates the content end 312, the rotation module 514 can rotate the program channel 314 in the channel rotation 332 representing from top row instance of the interface subsection 220 to bottom row instance of the interface subsection 220.

For another example, the rotation module 514 can rotate the program channel 314 based on the display size 226 of FIG. 2 of the client device 202. More specifically, the display size 226 of the display interface 218 of the client device 202 representing a TV can be larger than the display size 226 of the display interface 218 of the client device 202 representing a tablet. The content status 306 of the content program 208 displayed on the TV can indicate the content end 312. The content status 306 of the content program 208 displayed on the tablet can indicate the content beginning 308.

The rotation module 514 can rotate the program channel 314 displayed on the tablet to the TV and rotate the program channel 314 displayed on the TV to the tablet based on the content status 306 of the content program 208. Moreover, the rotation module 514 can rotate the program channel 314 from the client device 202 having the smaller of the display size 226 to the client device 202 having the larger of the display size 226. Furthermore, the rotation module 514 can rotate the program channel 314 displaying the content program 208 indicating the content beginning 308 from the client device 202 having the smaller of the display size 226 to the client device 202 having the larger of the display size 226. The rotation module 514 can communicate the channel rotation 332 to the client device 202.

The computing system 100 can include a synchronization module 516, which can couple to the provider module 504. The synchronization module 516 synchs the content program 208. For example, the synchronization module 516 can synch same instance of the content program 208 displayed on a plurality of the client device 202.

The synchronization module 516 can synch the content program 208 in a number of ways. For example, the synchronization module 516 can synch the content program 208 if the plurality of the client device 202 are displaying the same instance of the content program 208. More specifically, the synchronization module 516 can synch the content program 208 based on the content audio 318 played on each instances of the client device 202.

For a specific example, the client device 202 representing a TV can receive the free program 214 representing the content program 208 from the provider type 210 representing OTA. The client device 202 representing a tablet can receive the subscriber based program 216 representing the same instance of the content program 208 from the provider type 210 representing a subscriber based service. Each instances of the client device 202 can include the detecting sensor 228 of FIG. 2 representing a microphone.

The synchronization module 516 can synch the content program 208 based on matching the content audio 318 of FIG. 3 played by one instance of the client device 202 with the content audio 318 played by another instance of the client device 202. As an example, the content program 208 aired by OTA may not have a delay while the content program 208 provided by a subscriber based provider, such as a cable company, may have a delay in airing the content program 208. The synchronization module 516 can synch the content program 208 displayed on a plurality of the client device 202 by matching the audio frequency of the content audio 318 between the content program 208 displayed by the plurality of the client device 202. More specifically, the synchronization module 516 can stop the display of the content program 208 without the delay to match the display of the content program 208 with the delay until the content audio 318 for each presentation of the content program 208 are matched.

For a different example, the synchronization module 516 can synch the content program 208 based on matching the content status 306 of the content program 208. As discussed above, the content program 208 aired by OTA may not have a delay while the content program 208 provided by a subscriber based service may have a delay in airing the content program 208. The synchronization module 516 can synch the content program 208 displayed on a plurality of the client device 202 by matching the content status 306 between the instances of the content program 208 displayed by the plurality of the client device 202. More specifically, the synchronization module 516 can stop the display of the content program 208 without the delay to match the display of the content program 208 with the delay by synchronizing the content status 306 for the content program 208. The synchronization module 516 can communicate the content program 208 to a control module 518.

It has been discovered that the computing system 100 synchronizing the content program 208 displayed on a plurality of the client device 202 improves the efficiency of delivering the content program 208. By synchronizing the content audio 318, the content status 306 displayed, or a combination thereof, the computing system 100 can eliminate the lag based on receiving the content program 208 from a plurality of the provider type 210. As a result, the computing system 100 can improve the quality of delivering the content program 208 to enhance the user experience for operating the client device 202, the computing system 100, or a combination thereof.

The computing system 100 can include the control module 518. The control module 518 determines the presentation filter 334 of FIG. 3. For example, the control module 518 can determine the presentation filter 334 for displaying the content program 208 on the client device 202.

The control module 518 can determine the presentation filter 334 in a number of ways. For example, the control module 518 can determine the presentation filter 334 based on the content type 302, the user profile 234, the audience type 232 of FIG. 2, the current location 230 of FIG. 2, or a combination thereof.

For a specific example, the control module 518 can determine the current location 230 based on the location unit 420 of FIG. 4 identifying the GPS fix of the client device 202 operated by the user. The current location 230 can be determined that the user is at the user's home. The user profile 234 can indicate that the user is an adult. Based on the current location 230 and the user profile 234, the control module 518 can determine the presentation filter 334 to represent "no filter."

For a different example, the content type 302 can represent for adult viewing only. The content program 208 for adult viewing can be for a person who is at least 18 years old. The user profile 234 for the client device 202 located can represent a 15 year old female. The control module 518 can determine the presentation filter 334 of "filter" for blocking the content program 208 to be displayed on the client device 202.

For a different example, the client device 202 can represent a TV. The TV can include a plurality of the interface subsection 220 displaying a plurality of the content program 208. One instance of the content program 208 can represent the content type 302 for child viewing. The control module 518 can determine the audience type 232 to include a child in the audience viewing the content program 208 based on the content type 302 displayed on the TV. Based on the content type 302 displayed on the interface subsection 220, the control module 518 can determine the presentation filter 334 to monitor the content type 302 to be displayed on the client device 202. As a result, based on the above example, the control module 518 can determine the presentation filter 334 of "filter" to block the content type 302 representing an adult viewing to be displayed on the client device 202.

For a different example, the control module 518 can determine the presentation filter 334 based on the user profile 234 operating the client device 202. As discussed above, the audience type 232 can include a child for the client device 202 representing a TV. The user profile 234 for another instance of the client device 202 representing a tablet can represent an adult. The control module 518 can determine the presentation filter 334 that is different between one instance of the client device 202 and another instance of the client device 202. More specifically, the control module 518 can determine the presentation filter 334 of "filter" for the TV while "no filter" for the tablet.

For a different example, the control module 518 can determine the presentation filter 334 based on the timeframe 236. More specifically, the control module 518 can granary update the presentation filter 334 based on the timeframe 236.

For a specific example, if the timeframe 236 is between 2 pm to 4 pm, the control module 518 can determine the presentation filter 334 to represent "high filter" to block the content type 302 representing adult content from the audience type 232 of a child. The control module 518 can determine the presentation filter 334 of "medium filter" between 4 pm to 8 pm to allow some instances of the content type 302 representing adult content to be viewable on the client device 202. The control module 518 can determine the presentation filter 334 of "low filter" between 8 pm to 12 am to allow all instances of the content type 302 representing adult content to be viewable on the client device 202.

The physical transformation for providing the feedback 320 results in the movement in the physical world, such as people using the first device 102, the second device 106, the third device 108, or a combination thereof, based on the operation of the computing system 100. As the movement in the physical world occurs, the movement itself creates additional information that is converted back into switching the content program 208, determining the interface subsection 220 to be used for display, rotating the program channel 314, or a combination thereof for the continued operation of the computing system 100 and to continue movement in the physical world.

The first software 426 of FIG. 4 of the first device 102 of FIG. 4 can include the computing system 100. For example, the first software 426 can include the receiver module 502, the provider module 504, the synchronization module 516, and the control module 518.

The first control unit 412 of FIG. 4 can execute the first software 426 for the receiver module 502 to receive the content program 208. The first control unit 412 can execute the first software 426 for the provider module 504 to provide the content program 208. The first control unit 412 can execute the first software 426 for the synchronization module 516 to synch the content program 208. The first control unit 412 can execute the first software 426 for the control module 518 to determine the presentation filter 334.

The second software 442 of FIG. 4 of the second device 106 of FIG. 4 can include the computing system 100. For example, the second software 442 can include the receiver module 502, the provider module 504, the synchronization module 516, and the control module 518.

The second control unit 434 of FIG. 4 can execute the second software 442 for the receiver module 502 to receive the content program 208. The second control unit 434 can execute the second software 442 for the provider module 504 to provide the content program 208. The second control unit 434 can execute the second software 442 for the synchronization module 516 to synch the content program 208. The second control unit 434 can execute the second software 442 for the control module 518 to determine the presentation filter 334.

The third software 466 of FIG. 4 of the third device 108 of FIG. 4 can include the computing system 100. For example, the third software 466 can include the receiver module 502, the provider module 504, the synchronization module 516, and the control module 518.

The third control unit 452 of FIG. 4 can execute the third software 466 for the receiver module 502 to receive the content program 208. The third control unit 452 can execute the third software 466 for the provider module 504 to provide the content program 208. The third control unit 452 can execute the third software 466 for the synchronization module 516 to synch the content program 208. The third control unit 452 can execute the third software 466 for the control module 518 to determine the presentation filter 334.

The computing system 100 can be partitioned between the first software 426, the second software 442, and the third software 466. For example, the second software 442 can include the receiver module 502 and the provider module 504. The second control unit 434 can execute modules partitioned on the second software 442 as previously described.

The first software 426 can include the synchronization module 516 and the control module 518. Based on the size of the first storage unit 414 of FIG. 4, the first software 426 can include additional modules of the computing system 100. The first control unit 412 can execute the modules partitioned on the first software 426 as previously described.

The third software 466 can include the receiver module 502. Based on the size of the third storage unit 464 of FIG. 4, the third software 466 can include additional modules of the computing system 100. The third control unit 452 can execute the modules partitioned on the third software 466 as previously described.

The first control unit 412 can operate the first communication unit 416 of FIG. 4 to communicate the content program 208 to or from the second device 106 through the communication path 104 of FIG. 1. The first control unit 412 can operate the first software 426 to operate the location unit 420. The second communication unit 436 of FIG. 4 can communicate the content program 208 to or from the second device 106 through the communication path 104. The third communication unit 456 of FIG. 4 can communicate the content program 208 to or from the second device 106 through the communication path 104. The first user interface 418 of FIG. 4, the second user interface 438 of FIG. 4, the third user interface 458 of FIG. 4, or a combination thereof can represent the display interface 218, the interface subsection 220, or a combination thereof.

The computing system 100 describes the module functions or order as an example. The modules can be partitioned differently. For example, the receiver module 502 and the provider module 504 can be combined. Each of the modules can operate individually and independently of the other modules. Furthermore, data generated in one module can be used by another module without being directly coupled to each other. For example, the control module 518 can receive the content program 208 directly from the provider module 504. Further, "communicating" can represent sending, receiving, or a combination thereof the data generated to or from another.

The modules described in this application can be hardware circuitry, hardware implementation, or hardware accelerators in the first control unit 412, the third control unit 452, or in the second control unit 434. The modules can also be hardware circuitry, hardware implementation, or hardware accelerators within the first device 102, the second device 106, or the third device 108 but outside of the first control unit 412, the second control unit 434, or the third control unit 452, respectively as depicted in FIG. 4. However, it is understood that the first control unit 412, the second control unit 434, the third control unit 452, or a combination thereof can collectively refer to all hardware accelerators for the modules.

The modules described in this application can be implemented as instructions stored on a non-transitory computer readable medium to be executed by the first control unit 412, the second control unit 434, the third control unit 452, or a combination thereof. The non-transitory computer medium can include the first storage unit 414 of FIG. 4, the second storage unit 446 of FIG. 4, the third storage unit 454 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

Figure 6:
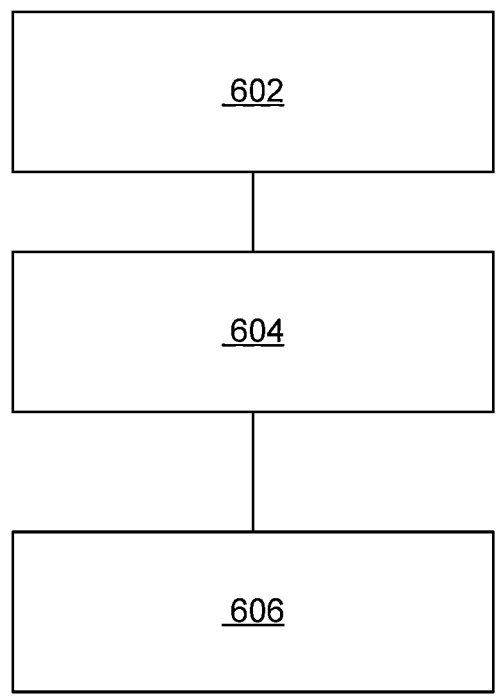
FIG. 6 is a flow chart of a method of operation of the computing system in a further embodiment of the present invention.

Referring now to FIG. 6, therein is shown a flow chart of a method 600 of operation of the computing system 100 in a further embodiment of the present invention. The method 600 includes: receiving a content program including a free program, a subscriber based program, or a combination thereof in a block 602; determining a populating location based on the content program with a control unit for presenting the content program on a plurality of an interface subsection of a device in a block 604; and updating the populating location based on a content status for changing from one instance of the interface subsection to another instance of the interface subsection to present the content program in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an computing system comprising:
 receiving content programs representing broadcasted contents including a free program, a subscriber based program, or a combination thereof;
 determining a number of an interface subsection based on a user profile including an interface count meeting or below a count threshold;
 determining a populating location for each of the content programs with a control unit for presenting each of the content programs on each of a plurality of the interface subsection of a device; and
 updating the populating location based on a content status for changing from one instance of the interface subsection to another instance of the interface subsection to present the content programs.

2. The method as claimed in claim 1 further comprising rotating a program channel based on a content status for changing a content program displayed from one instance of the interface subsection to another instance of the interface subsection.

3. The method as claimed in claim 1 further comprising synching a content program for matching a plurality of a content audio of the content program presented on a plurality of the device.

4. The method as claimed in claim 1 further comprising synching a content program for matching a plurality of the content status of the content program presented on a plurality of the device.

5. The method as claimed in claim 1 further comprising switching the one instance of a content program with the another instance of the content program based on the content status for presenting the another instance of the content program displayed on another instance of the device.

6. The method as claimed in claim 1 further comprising providing a feedback based on a trigger point for notifying the content status of a content program.

7. The method as claimed in claim 1 further comprising setting a trigger point based on the content status for triggering a feedback provided on another device.

8. The method as claimed in claim 1 further comprising providing a notification based on the content status of a content program for prioritizing the content status of the content program displayed on one instance of the device over another instance of the device.

9. The method as claimed in claim 1 further comprising providing a notification based on the content status of a content program for prioritizing the content status of the content program displayed on the one instance of the interface subsection over the another instance of the interface subsection.

10. The method as claimed in claim 1 further comprising a presentation filter based on a content type for filtering a content program displayed on the device.

11. A computing system comprising:
 a control unit including a processor for:
   receiving content programs representing broadcasted contents including a free program, a subscriber based program, or a combination thereof,
   determining a number of an interface subsection based on a user profile including an interface count meeting or below a count threshold;
   determining a populating location for each of the content programs for presenting each of the content programs on each of a plurality of the interface subsection, updating the populating location based on a content status for changing from one instance of the interface subsection to another instance of the interface subsection to present the content programs, and a communication unit, coupled to the control unit, for communicating the content programs for presenting on a device.

12. The system as claimed in claim 11 wherein the control unit is for rotating a program channel based on the content status for changing a content program displayed from one instance of the interface subsection to another instance of the interface sub section.

13. The system as claimed in claim 11 wherein the control unit is for synching a content program for matching a plurality of a content audio of the content program presented on a plurality of the device.

14. The system as claimed in claim 11 wherein the control unit is for synching a content program for matching a plurality of the content status of the content program presented on a plurality of the device.

15. The system as claimed in claim 11 wherein the control unit is for switching the one instance of a content program with the another instance of the content program based on the content status for presenting the another instance of the content program displayed on another instance of the device.

16. A non-transitory computer readable medium including instructions for execution by a control unit comprising:

receiving content programs representing broadcasted contents including a free program, a subscriber based program, or a combination thereof;

determining a number of an interface subsection based on a user profile including an interface count meeting or below a count threshold;

determining a populating location for each of the content programs for presenting each of the content programs on each of a plurality of the interface subsection of a device; and updating the populating location based on a content status for changing from one instance of the interface subsection to another instance of the interface subsection to present the content programs.

17. The non-transitory computer readable medium as claimed in claim 16 further comprising rotating a program channel based on the content status for changing a content program displayed from one instance of the interface subsection to another instance of the interface subsection.

18. The non-transitory computer readable medium as claimed in claim 16 further comprising synching a content program for matching a plurality of a content audio of the content program presented on a plurality of the device.

19. The non-transitory computer readable medium as claimed in claim 16 further comprising synching a content program for matching a plurality of the content status of the content program presented on a plurality of the device.

20. The non-transitory computer readable medium as claimed in claim 16 further comprising switching the one instance of a content program with the another instance of the content program based on the content status for presenting the another instance of the content program displayed on another instance of the device.

* * * * *